US011627069B2

(12) United States Patent
Moshe et al.

(10) Patent No.: US 11,627,069 B2
(45) Date of Patent: Apr. 11, 2023

(54) DEVICE AND A SYSTEM FOR OSPF COST METRICS MIRRORING

(71) Applicant: DRIVENETS LTD., Raanana (IL)

(72) Inventors: Yuval Moshe, Ra'anana (IL); Amir Krayden, Even Yehuda (IL); Alexander Zilberman, Hadera (IL); Evgeny Sandler, Herzliya (IL)

(73) Assignee: DRIVENETS LTD., Raanana (IL)

( * ) Notice: Subject to any disclaimer, the term of this patent is extended or adjusted under 35 U.S.C. 154(b) by 72 days.

(21) Appl. No.: 17/054,269

(22) PCT Filed: Apr. 21, 2019

(86) PCT No.: PCT/IL2019/050455
§ 371 (c)(1),
(2) Date: Nov. 10, 2020

(87) PCT Pub. No.: WO2019/220425
PCT Pub. Date: Nov. 21, 2019

(65) Prior Publication Data
US 2021/0250276 A1 Aug. 12, 2021

Related U.S. Application Data

(60) Provisional application No. 62/670,722, filed on May 12, 2018.

(51) Int. Cl.
*H04L 12/721* (2013.01)
*H04L 45/12* (2022.01)
(52) U.S. Cl.
CPC .................. *H04L 45/123* (2013.01)

(58) Field of Classification Search
CPC ..................................................... H04L 45/123
USPC ........................................................... 370/254
See application file for complete search history.

(56) References Cited

U.S. PATENT DOCUMENTS

| | | | |
|---|---|---|---|
| 7,903,554 B1 | 3/2011 | Manur et al. | |
| 7,983,239 B1 * | 7/2011 | Weinstein | H04L 45/04 370/351 |
| 2008/0130500 A1 | 6/2008 | Retana et al. | |
| 2010/0214932 A1 * | 8/2010 | Qian | H04L 45/46 370/252 |
| 2014/0016477 A1 | 1/2014 | Yedavalli et al. | |

(Continued)

FOREIGN PATENT DOCUMENTS

| | | |
|---|---|---|
| EP | 1817881 A2 | 8/2007 |
| EP | 2413540 A1 | 2/2012 |

(Continued)

*Primary Examiner* — Faisal Choudhury
(74) *Attorney, Agent, or Firm* — Browdy and Neimark, PLLC

(57) ABSTRACT

A communication router, adapted for use in an Open Shortest Path First (OSPF) protocol compliant communication network, is provided. The communication router comprises processing means configured to automatically adjust the communication router's cost metrics set for forwarding communication traffic via at least one link that extends between that communication router and a respective adjacent neighboring router. The cost metrics is adjusted in compliance with costs determined by the respective adjacent neighboring router for forwarding traffic from the respective adjacent neighboring router along that link.

11 Claims, 1 Drawing Sheet

(56) References Cited

U.S. PATENT DOCUMENTS

| | | | | |
|---|---|---|---|---|
| 2014/0254387 A1* | 9/2014 | Tetteh | ................... | H04L 47/15 |
| | | | | 370/238 |
| 2014/0334286 A1* | 11/2014 | Ernstrom | ................ | H04L 45/28 |
| | | | | 370/216 |
| 2016/0164739 A1* | 6/2016 | Skalecki | ................. | H04L 41/40 |
| | | | | 370/389 |

FOREIGN PATENT DOCUMENTS

| | | | | |
|---|---|---|---|---|
| JP | 2011077618 | A | * | 4/2011 |
| WO | 2013086653 | A1 | | 6/2013 |

* cited by examiner

DEVICE AND A SYSTEM FOR OSPF COST METRICS MIRRORING

TECHNICAL FIELD

The present disclosure generally relates to the field of communication systems. More particularly, the present disclosure relates to the implementation of Open Shortest Path First (hereinafter "OSPF") protocol in Internet Protocol (IP) communication networks.

Glossary

BFD—Bi-Directional Forwarding Detection.
ISP—Internet Service Provider
LAG—Link Aggregation Group
LSA—Link State Advertisements
OSPF—Open Shortest Path First

BACKGROUND

OSPF cost assignment as defined in the IETF Request for Comments (RFC) 2328, "OSPF protocol", is based on a cost being associated with the output side of each router interface. A cost which is configurable by the system administrator. The lower the cost is, the more likely is that the interface will be used to forward data traffic. Costs are also associated with externally derived routing data (e.g., the BGP-learned routes).

Neighboring network elements that comply with the OSPF protocol exchange routing information in Link-State Advertisements (LSA). LSA include information that concerns the router interface, networks, as well as connections with elements implementing external protocols or with areas external to the network, implementing the OSPF protocol.

An LSA type 1 (Router LSA) includes information on the router interfaces, including the interface output cost. This information represents the cost associated with sending a data packet via the interface, expressed in the link state metric.

The present invention seeks to provide a solution for various network deployments which can benefit by automatically adjusting the OSPF interface cost metrics according to an adjacent OSPF neighbor interface cost value, rather than simply applying a local value assigned by the system administrator, as suggested in the art.

SUMMARY

The disclosure may be summarized by referring to the appended claims.

It is an object of the present disclosure to provide a router, a system and a software to automatically adjust the router OSPF interface cost metrics according to the cost value of its adjacent OSPF neighboring router's interface.

It is another object of the disclosure to provide a router, a system and a software to automatically adjust the router OSPF interface cost metrics according to the cost value of its adjacent OSPF neighboring router's interface, for a single link and/or for a group of links.

Other objects of the present disclosure will become apparent from the following description.

According to a first embodiment of the present disclosure, there is provided a communication router, for use in an OSPF compliant communication network, wherein the communication router comprises a processing means configured to automatically adjust the communication router's cost metrics set for forwarding communication traffic by that communication router via at least one link that extends between the communication router and a respective adjacent neighboring router, wherein the cost metrics is adapted to be adjusted in compliance with costs determined by the respective adjacent neighboring router for forwarding traffic from that respective adjacent neighboring router along the same at least one link.

The terms "cost metrics" or "cost value" as used herein throughout the specification and claims, is used to denote values that are used by communication routers to determine the best path to a destination address (e.g. a destination network). The costs of conveying traffic along a certain communication link is among the factors by which the preferred path to a particular destination is selected. If there are multiple routes to a destination (e.g. a network) with the same route type, the OSPF metric calculated as cost based on the bandwidth is typically used for selecting the best route. The route with the lowest value for cost is chosen as the best route. The cost calculation may be based for example on a reference bandwidth of 100 Mbps. The formula to calculate the cost may be the reference bandwidth divided by interface bandwidth. For example, in the case of 10 Mbps Ethernet, OSPF metric cost value is 100 Mbps/10 Mbps=10. The default reference bandwidth of OSPF may be 100 Mbps and the default OSPF cost formula may not differentiate between interfaces having a bandwidth faster than 100 Mbps. However, other reference bandwidths of OSPF, such as reference bandwidth of 1 and 10 Gbps may also be used.

The term "cost mirroring" as used herein throughout the specification and claims is used to denote an algorithm which is implemented according to the solution provided in accordance with the present invention, by which, when the costs metrics is changed at a router interface located at one end of a communication link, the same change would be automatically affected at a router comprising an interface that is located at the other end of that communication link.

According to another embodiment of the disclosure, the communication router is configured to receive Link-State Advertisements (LSA) forwarded by at least one of its adjacent neighboring routers and to retrieve therefrom information that would allow the communication router to automatically adjust its cost metrics for forwarding communication traffic along that at least one link.

In accordance with another embodiment, the respective adjacent neighboring router and the communication router do not belong to a single administrative domain.

The term "administrative domain" that is used herein throughout the specification and claims, is used to encompass a service security provider that holds security repositories and authenticates and authorizes clients with credentials safely. An administrative domain may include a network of computers or a collection of networks and databases, which fall under a single common administration.

By yet another embodiment, the communication router comprises a plurality of interfaces adapted to forward communication traffic, wherein each of the plurality of interfaces is associated with a respective link, and wherein each of the plurality of links is a member of a Link Aggregation Group (LAG).

According to still another embodiment, the processing means is further configured to form an OSPF adjacency across a LAG, whereby the same attributes are shared by the members of the LAG, as if it is a single interface adjacency as described above.

In accordance with another aspect of the disclosure, there is provided a system comprising at least two network domains, each comprising a communication router and configured to interact with each other by implementing OSPF protocol, wherein the system is characterized in that when a change is affected in a cost metrics of a first of the at least two communication routers, wherein said cost metrics being adapted to provide information for forwarding traffic along a link that extends between an interface belonging to said first communication router and a second interface that belongs to a second communication router, a corresponding change will automatically be affected in the cost metrics associated with the second communication router.

According to another embodiment of this aspect of the disclosure, the first communication router is located within an ISP network domain, and the second communication router is located within a customer network domain. Preferably, the first communication router is adapted to instruct the second communication router to configure at least one interface thereof to comply with an OSPF cost mirroring mechanism, thereby upon occurrence of a change in the cost metrics for forwarding communication traffic by the first communication router via a link that extends between the first communication router and the second communication router, the second communication router will automatically adjust the costs metrics associated with forwarding communication traffic by the second communication router via that link, to comply with the change affected in the cost metrics associated with the first communication router.

According to another aspect of the disclosure, there is provided a computer program product for use in an OSPF compliant communication network, wherein the computer program product is configured to encode a computer program stored on a non-transitory computer-readable medium for executing a set of instructions by one or more computer processors for carrying out a method that comprises the steps of:
(1) configuring a communication router adapted to implement OSPF protocol, to store a cost metrics for forwarding communication traffic by the communication router via at least one link that extends between that communication router and a respective adjacent neighboring router;
(2) upon receiving information that a cost metrics comprising information that is associated with forwarding communication traffic by the respective adjacent neighboring router, has been changed, affecting that change at the cost metrics of the communication router.

According to yet another embodiment, the respective adjacent neighboring router and the communication router do not belong to a single administrative domain.

In accordance with still another embodiment of the disclosure, the computer program product is further configured a) to form an OSPF adjacency across a plurality of interfaces, where each of the interfaces is associated with a respective link, and wherein each of the plurality of links is a member of a Link Aggregation Group (LAG), and b) to enable sharing the same attributes by the members of the LAG.

BRIEF DESCRIPTION OF THE DRAWINGS

The accompanying drawings, which are incorporated herein and constitute a part of this specification, illustrate several embodiments of the disclosure and, together with the description, serve to explain the principles of the embodiments disclosed herein.

DESCRIPTION OF EXEMPLARY EMBODIMENTS

Some of the specific details and values in the following detailed description refer to certain examples of the disclosure. However, this description is provided only by way of example and is not intended to limit the scope of the invention in any way. As will be appreciated by those skilled in the art, the claimed method and device may be implemented by using other methods that are known in the art per se. In addition, the described embodiments comprise different steps that are carried out, not all of which are required in all embodiments of the invention. The scope of the invention can be summarized by referring to the appended claims.

The mechanism disclosed by the present invention that is referred to herein as "OSPF cost mirroring" mechanism, is a mechanism that is configured to set automatically an interface OSPF cost metrics in compliance with the OSPF cost metrics assigned by an adjacent neighbor to the same link. This functionality is preferably achieved by having the network element (e.g. router) listening to OSPF LSA messages (e.g. LSA type 1 advertisements) that are received from an adjacent OSPF neighbor. The capability to listen to an OSPF neighbor Router-LSA and then alter self (local) OSPF cost metrics in compliance with the information retrieved while listening to the LSA messages, may be applied as a configurable functionality on a per-link basis. As would be appreciated by those skilled in the art, this functionality is conceptually different from the standard cost assignment practice, by which a configurable value is assigned to the network element's cost metrics by the system administrator, per each router interface.

While an interface OSPF cost is set per its output direction only, there are scenarios in which a matching OSPF cost for both neighbors on a given link, may be beneficial.

OSPF neighbors which do not belong to the same administrative domain, are likely to be configured or controlled by different automated administration systems or manual administrators. In case an equal cost is required for both ends of the same network or of the same link, it is quite cumbersome to operate a cross-domain alignment of OSPF cost configurations by implementing the above-described prior art methods, by which an Internet Service Provider (ISP), who chooses to control and alter a single router on the specified link, has to instruct also the neighboring domain to match the configured OSPF cost, where the neighboring domain may be an organization within the same ISP, another ISP or even a customer. In contradistinction, the solution provided by the present invention enables achieving this target, irrespective of the neighboring domain(s) while implementing the OSPF adjacency-based solution disclosed herein.

Figure 1:
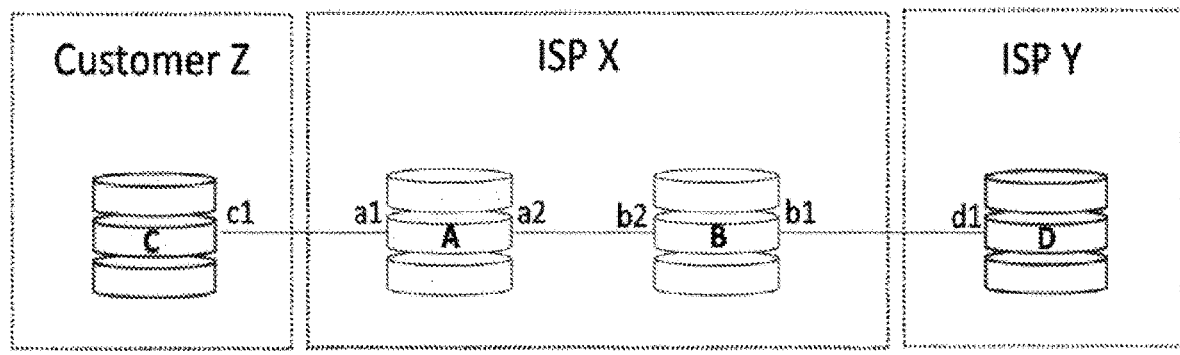
FIG. 1 illustrates a schematic view of an example of an ISP domain and a customer network domain, interacting therebetween by using OSPF protocol across multiple platforms, each comprising a single physical interface associated with the interconnecting link.

FIG. 1 illustrates a schematic view of an example by which an ISP and customer network domains interact with each other by using the OSPF protocol implemented across multiple platforms using single physical interfaces for the interconnecting links. In this example, let us assume that ISP X chooses to configure OSPF cost mirroring on interface b2 of router B. Now, when a change occurs in the OSPF cost metrics of interface a2 which is associated with router A, router B would automatically alter its own OSPF cost metrics for link b2 to match that change.

ISP X may choose to instruct customer Z to configure interface c1 of router C to comply with OSPF cost mirroring. Thus, in case of a change in the OSPF cost metrics assignment associated with interface a1 of router A, router C would consequently change automatically its own OSPF cost metrics for the link c1.

In addition, ISP X depicted in this figure, may choose to instruct ISP Y to configure an OSPF cost mirroring policy at router D. Consequently, in case of a change in the OSPF cost metrics assignment associated with interface b1 of router B, router D would automatically alter its own OSPF cost metrics for the link d1 to match that change.

LAG Cost Fallback

Routers may form OSPF adjacencies across a single physical interface or multiple interfaces that are bound together in a single Link Aggregation Group (LAG). An OSPF adjacency formed across a LAG, shares the same attributes as if it were a single interface adjacency. However, in case of a physical link failure at which an OSPF adjacency exists, the behavior of each of the two adjacencies, might differ from the other. In case of a single link failure in an OSPF adjacency across a single physical interface, the OSPF adjacency will terminate, either immediately, following the detection of physical signal loss, or following a failure detection by a failure detection mechanism such as BFD. In the case of a physical link failure, wherein this link is a member included in the LAG, the OSPF adjacency will not terminate unless all members of the same LAG group are down (either logically by software commands or physically by hardware failure). In case the Internet Service Provider (ISP) has multiple paths to reach an OSPF network located downstream of the adjacent OSPF neighbor LAG interface, the system administrator may decide to change the OSPF cost of the LAG interface to a higher value. In doing so, ISP routers sharing OSPF information may perform Shortest Path Calculation ("SPF") and optimize the path to reach the downstream OSPF network via alternate routers or links that extend within the network. This feature may be referred to as a lag-cost-fallback.

Figure 2:
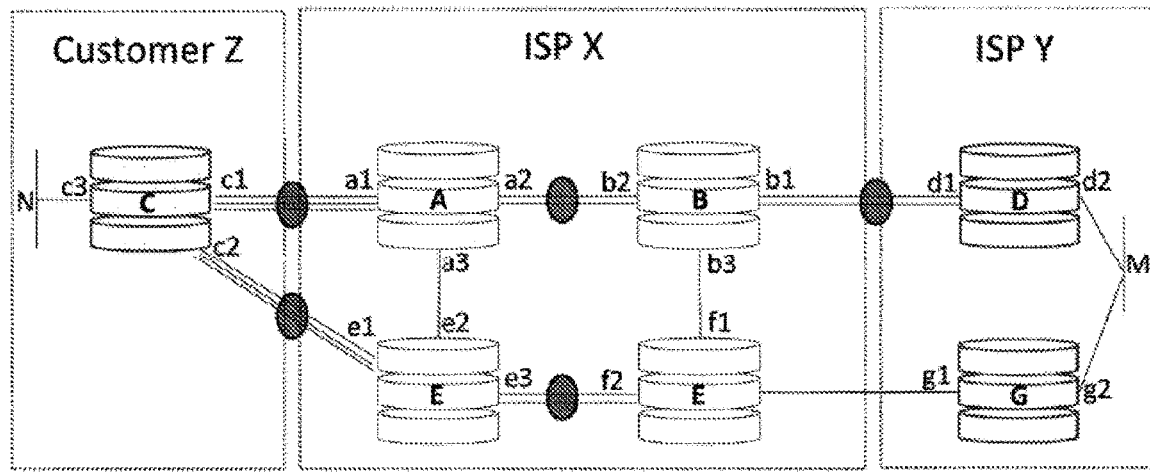
FIG. 2 illustrates a schematic view of another example of an ISP domain and a customer network domain, interacting therebetween using the OSPF protocol across multiple platforms comprising LAG interfaces associated with the interconnecting links.

Turning now to FIG. 2, router B of ISP X is provided with multiple paths, where each of which may be used to convey traffic to network N of customer Z. Let us now assume that the shortest path to reach network N extends from B(b2), via A(a1) to C(c3). In case of an update to the OSPF cost at interface a1 of router A, router B may opt to choose an alternate path, one that extends from B(b2) via A(a3) and E(e1) to C(c3).

It should be noted however that some routers' software might not support a lag-cost-fallback mechanism, therefore it could be that some service providers or customers might decline to activate this feature.

ISP X illustrated in FIG. 2 may choose to configure router A to comply with the lag-cost-fallback mechanism and OSPF cost-mirroring mechanism for router B. In case of a member failure at a2 LAG interface, router A will change the OSPF cost of the link, and router B would automatically change its own OSPF cost metrics for the same link (b2) without being required to configure an OSPF cost-fallback.

Next, let us assume that router C of customer Z shown in FIG. 2, does not support the lag-cost-fallback feature. In this case, ISP X may choose to instruct customer Z to configure link c1 of router C to comply with the OSPF cost mirroring mechanism. In case of a member failure at the LAG interface, router A changes the OSPF cost of the link and router C would automatically follow by changing its own OSPF cost metrics for the same link (c1).

In case that ISP Y router shown in FIG. 2 does not support the "lag-cost-fallback" feature, ISP X may choose to instruct ISP Y to configure OSPF cost mirroring mechanism for routers D and G. In case of a member failure at b1 LAG interface, router B changes the OSPF cost of the link and router D would automatically follow by changing its own OSPF cost metrics for the same link (d1).

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A communication router, adapted for use in an Open Shortest Path First (OSPF) protocol compliant communication network, wherein said communication router comprises:
    a processor configured to adjust the communication router's cost metrics for forwarding communication traffic therefrom via a link that extends between said communication router and a respective adjacent neighboring router, at a first direction of said link,
    wherein said communication router is located at an administrative domain different from the administrative domain at which said respective adjacent neighboring router is located,
    and wherein the cost metrics is adjusted automatically in compliance with cost metrics determined by the respective adjacent neighboring router for forwarding traffic from said communication router along said link, wherein said automatic adjustment of the cost metrics is carried out by said communication router in compliance with the cost metrics determined by the respective adjacent neighboring router for forwarding traffic at a second direction, wherein said second direction being an opposite direction of said link from said first direction.

2. The communication router of claim 1, configured to receive Link-State Advertisements (LSA) forwarded by the at least one of its adjacent neighboring routers and to retrieve therefrom information that allows said communication router to automatically adjust its cost metrics for forwarding communication traffic along said at least one link.

3. The communication router of claim 1, wherein said respective adjacent neighboring router and said communication router do not belong to a single administrative domain.

4. The communication router of claim 1, wherein said communication router comprises a plurality of interfaces adapted to forward communication traffic, wherein each of said plurality of interfaces is associated with a respective link, and wherein each of the plurality of links is a member of a Link Aggregation Group (LAG).

5. The communication router of claim 4, wherein said processing means is adapted to form an Open Shortest Path First (OSPF) adjacency across a Link Aggregation Group (LAG), whereby the same attributes are shared by the members of the LAG.

6. A system comprising two administrative domains, a first administrative domain that comprises a first communication router and a second administrative domain that comprises a second communication router, wherein said first and second communication routers are configured to interact with each other by implementing an Open Shortest Path First (OSPF) protocol, wherein each of said communication routers comprises a processor configured to automatically adjust its own cost metrics for forwarding communication traffic via a link that extends between said first and second communication routers, and wherein said system is configured such that when a change is affected in a cost metrics of the first communication router associated with forwarding traffic along a link that extends between an interface belonging to said first communication router to an interface belonging to said second communication router, information regarding said change is conveyed to the second router for automatically adapting a cost metrics of said second communication router associated with forwarding traffic along a link that extends between the interface belonging to said second communication router to the interface belonging to said first communication router, thereby when said change is affected in a cost metrics of the first communication router of said link in one direction, it automatically triggers a change in the cost metrics of the second communication router of said link in an opposite direction.

7. The system of claim 6, wherein the first communication router is located within an Internet Service Provider (ISP) network domain, and the second communication router is located within a customer network domain, said first communication router is adapted to instruct the second communication router to configure at least one interface thereof to comply with an Open Shortest Path First (OSPF) cost mirroring mechanism, thereby upon occurrence of a change in the cost metrics for forwarding communication traffic by the first communication router via a link that extends between the first communication router and the second communication router, the second communication router will automatically adjust the costs metrics associated with forwarding communication traffic by the second communication router via that link, to comply with the change affected in the cost metrics associated with the first communication router.

8. The system of claim 6, wherein a first of the communication routers is located within an Internet Service Provider (ISP) network domain, and a second of the communication routers is located within another ISP network domain, said first communication router is configured to instruct said second communication router to configure at least one interface thereof to comply with an Open Shortest Path First (OSPF) cost mirroring, thereby upon occurrence of a change in the cost metrics of forwarding communication traffic by said first communication router via a link that extends between said first communication router and the second communication router, said second communication router will automatically adjust the cost metrics associated with forwarding communication traffic by said second communication router via said link, to comply with the change in the cost metrics that was affected by the first communication router.

9. A computer program product for use in an Open Shortest Path First (OSPF) compliant communication network, wherein said computer program product is configured to encode a computer program stored on a non-transitory computer-readable medium for executing a set of instructions by one or more computer processors for carrying out a method that comprises the steps of:

(1) configuring a communication router adapted to implement OSPF protocol and located at a first administrative domain, to store a cost metrics for forwarding communication traffic by the communication router via a link that extends between that communication router and a respective adjacent neighboring router located at a different administrative domain, at a first direction of said link; and (2) upon receiving information that a cost metrics comprising information that is associated with forwarding communication traffic by the respective adjacent neighboring router at a second direction, being an opposite direction of said first direction, has been changed, affecting automatically a change at the cost metrics of the communication router for forwarding traffic along said first direction of the link.

10. The computer program product of claim 9, wherein said respective adjacent neighboring router and said communication router do not belong to a single administrative domain.

11. The computer program product of claim 9, wherein said computer program product is further configured to a) form an Open Shortest Path First (OSPF) adjacency across a plurality of interfaces, each of which is associated with a respective link, and wherein each of the plurality of links is a member of a Link Aggregation Group (LAG), and b) to enable sharing same attributes by the members of the LAG.

\* \* \* \* \*